US010694477B2

(12) United States Patent
Axén et al.

(10) Patent No.: US 10,694,477 B2
(45) Date of Patent: Jun. 23, 2020

(54) ASSISTED BEAMFORMING AT MOBILITY

(71) Applicant: Telefonaktiebolaget LM Ericsson (publ), Stockholm (SE)

(72) Inventors: Rasmus Axén, Linköping (SE); Pradeepa Ramachandra, Linköping (SE); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 202 days.

(21) Appl. No.: 15/501,111

(22) PCT Filed: Aug. 12, 2016

(86) PCT No.: PCT/SE2016/050752
§ 371 (c)(1),
(2) Date: Feb. 1, 2017

(87) PCT Pub. No.: WO2017/217901
PCT Pub. Date: Dec. 21, 2017

(65) Prior Publication Data
US 2018/0184387 A1 Jun. 28, 2018

Related U.S. Application Data

(60) Provisional application No. 62/349,301, filed on Jun. 13, 2016.

(51) Int. Cl.
*H04W 52/40* (2009.01)
*H04B 7/06* (2006.01)
(Continued)

(52) U.S. Cl.
CPC .......... *H04W 52/40* (2013.01); *H04B 7/0617* (2013.01); *H04W 36/0083* (2013.01);
(Continued)

(58) Field of Classification Search
CPC ... H04W 24/10; H04W 72/046; H04W 88/02; H04W 72/0446; H04W 74/0833; H04W 28/0226; H04W 36/00; H04W 72/0453; H04W 36/0085; H04W 36/0088; H04W 52/143; H04W 56/001
See application file for complete search history.

(56) References Cited

U.S. PATENT DOCUMENTS

2010/0311421 A1* 12/2010 Mach .................... H04W 48/16
455/436
2013/0258885 A1 10/2013 Yu et al.
(Continued)

OTHER PUBLICATIONS

3GPP, "3rd Generation Partnership Project; Technical Specification Group Radio Access Network; Study on Scenarios and Requirements for Next Generation Access Technologies; (Release 14)", 3GPP TR 38.913 V0.3.0, Mar. 2016, 1-30.
(Continued)

*Primary Examiner* — Kwasi Karikari
(74) *Attorney, Agent, or Firm* — Murphy, Bilak & Homiller, PLLC

(57) ABSTRACT

Systems and methods are disclosed herein relating to beam-switching in a wireless system. In some embodiments, a method of operation of a User Equipment device (UE) that transmits and/or receives to and/or from a source Antenna Node (AN) on a source beam comprises performing a Mobility Reference Signal (MRS) search to attempt to detect MRS transmitted by one or more candidate ANs for one or more candidate beam. The method further comprises, if one or more conditions that are indicative of the MRS search being unsuccessful are met, transmitting an indication that the MRS search was unsuccessful. In this manner, one or more network nodes are informed that an action(s) (e.g., assisted beam-formed MRS transmission and/or increasing MRS transmit power at candidate AN(s)) needs to be taken to enable a successful MRS search by the UE.

18 Claims, 12 Drawing Sheets

(51) Int. Cl.
| | |
|---|---|
| *H04W 36/00* | (2009.01) |
| *H04W 52/08* | (2009.01) |
| *H04W 52/14* | (2009.01) |
| *H04W 52/24* | (2009.01) |
| *H04W 36/06* | (2009.01) |
| *H04W 36/08* | (2009.01) |

(52) U.S. Cl.
CPC ....... *H04W 36/0094* (2013.01); *H04W 52/08* (2013.01); *H04W 52/143* (2013.01); *H04W 36/06* (2013.01); *H04W 36/08* (2013.01); *H04W 52/241* (2013.01)

(56) References Cited

U.S. PATENT DOCUMENTS

2015/0036598 A1* 2/2015 Kilpatrick, II ........ H04W 64/00 370/329
2015/0257073 A1 9/2015 Park et al.
2016/0044551 A1* 2/2016 Frenger ................ H04B 7/0617 370/252
2016/0044621 A1* 2/2016 Ding ................ H04W 56/0025 370/350
2017/0230869 A1* 8/2017 Kubota ................ H04L 5/0048

OTHER PUBLICATIONS

3GPP, "3rd Generation Partnership Project; Technical Specification Group Services and System Aspects; Study on architectural enhancements to support Mission Critical Push to Talk over LTE (MCPTT) services (Release 13)", 3GPP TR 23.779 V0.4.0, Nov. 2014, 1-32.
Unknown, Author, "Active Mode Mobility in NR: SINR drops in higher frequencies", 3GPP TSG-RAN WG2 #93bis, R2-162762, Dubrovnik, Croatia, Ericsson, Apr. 11-15, 2016, 1-4.
Unknown, Author, "New SID Proposal: Study on New Radio Access Technology", 3GPP TSG RAN Meeting #71, RP-160671, Goteborg, NTT DOCOMO, Mar. 7-10, 2016, 1-8.

* cited by examiner

ASSISTED BEAMFORMING AT MOBILITY

RELATED APPLICATIONS

This application claims the benefit of provisional patent application Ser. No. 62/349,301, filed Jun. 13, 2016, the disclosure of which is hereby incorporated herein by reference in its entirety.

TECHNICAL FIELD

The present disclosure relates to beam switching in a wireless communications network such as, for example, a cellular communications network.

BACKGROUND

Overall requirements for the Next Generation (NG) architecture as described in, e.g., Third Generation Partnership Project (3GPP) Technical Report (TR) 23.799 V0.4.0, "Study on Architecture for Next Generation System" and, more specifically, the NG Access Technology as described in, e.g., 3GPP TR 38.913 V0.3.0, "Study on Scenarios and Requirements for Next Generation Access Technologies" will impact the design of the Active Mode Mobility solutions for the New Radio Access Technology (RAT) (NR) as described in, e.g., NTT DOCOMO, "RP-160671: New SID Proposal: Study on New Radio Access Technology," 3GPP TSG RAN Meeting #71, Mar. 7-10, 2016 compared to the current mobility solution in 3GPP Long Term Evolution (LTE). Some of these requirements are the need to support network energy efficiency mechanisms, future-proofness, and the need to support a very wide range of frequencies, e.g., up to 100 gigahertz (GHz).

One of the main differences, with respect to LTE, comes from the fact that propagation in frequencies above the ones allocated to LTE is more challenging so that the massive usage of beamforming becomes an essential component of NR. Despite the link budget gains provided by beamforming solutions, reliability of a system purely relying on beamforming and operating in higher frequencies might be challenging since the coverage might be more sensitive to both time and space variations. As a consequence, the Signal to Interference plus Noise Ratio (SINR) of that narrow link can drop much quicker than in the case of LTE as described in Ericsson, "R2-162762: Active Mode Mobility in NR: SINR drops in higher frequencies," 3GPP TSG-RAN WG2 #93bis, Apr. 11-15, 2016.

SUMMARY

Systems and methods are disclosed herein relating to beam-switching in a wireless system. In some embodiments, a method of operation of a User Equipment device (UE) that transmits and/or receives to and/or from a source Antenna Node (AN) on a source beam comprises performing a Mobility Reference Signal (MRS) search to attempt to detect MRS transmitted by one or more candidate ANs for one or more candidate beam. The method further comprises, if one or more conditions that are indicative of the MRS search being unsuccessful are met, transmitting an indication that the MRS search was unsuccessful. In this manner, one or more network nodes are informed that an action(s) needs to be taken to enable a successful MRS search by the UE. The action(s) may be, for example, assisted beam-formed MRS transmission and/or increasing MRS transmit power at candidate AN(s).

In some embodiments, transmitting the indication comprises transmitting an uplink signal. Further, in some embodiments, the uplink signal is an uplink signal configured for the UE to trigger transmission of beam-formed MRS by the one or more candidate ANs. Further, in some embodiments, the uplink signal is an Uplink Synchronization Signal (USS). In some embodiments, the USS is a random access preamble.

In some embodiments, the method further comprises receiving configuration of the uplink signal from the source AN of the UE.

In some embodiments, the method further comprises, after transmitting an uplink signal, detecting a MRS transmitted by at least one of the one or more candidate ANs, and reporting the MRS detected by the UE to the source AN.

In some embodiments, the method further comprises, after transmitting the uplink signal, detecting a MRS transmitted by at least one of the one or more candidate ANs, and transmitting an uplink signal that matches the MRS detected by the UE. Further, in some embodiments, the uplink signal that matches the MRS detected by the UE is a USS that matches the MRS detected by the UE.

In some embodiments, transmitting the indication comprises transmitting a report to the source AN, the report comprising one of a group consisting of: an indication that no MRSs were detected by the UE during the MRS search and an indication that any MRSs detected by the UE during the MRS search have a received Signal to Interference plus Noise Ratio (SINR) that is below a predefined or preconfigured threshold.

In some embodiments, the one or more conditions comprise expiration of a timer.

In some embodiments, the one or more conditions comprise a condition that a timer has expired without detection of a MRS during the MRS search.

In some embodiments, the one or more conditions comprise a condition that a timer has expired without detection of a MRS having a received SINR that is above a predefined or preconfigured threshold.

In some embodiments, the indication triggers an increase in MRS transmit power by at least one of the one or more candidate ANs.

Embodiments of a UE that transmits and/or receives to and/or from a source AN on a source beam are also disclosed. In some embodiments, the UE is adapted to perform a MRS search to attempt to detect MRS transmitted by one or more candidate ANs for one or more candidate beams and, if one or more conditions that are indicative of the MRS search being unsuccessful are met, transmit an indication that the MRS search was unsuccessful. In some embodiments, the UE is further adapted to operate according to the method of operation of a UE according to any of the embodiments disclosed herein.

In some embodiments, a UE that transmits and/or receives to and/or from a source AN on a source beam comprises at least one transmitter, at least one receiver, at least one processor, and memory storing instructions executable by the at least one processor whereby the UE is operable to perform a MRS search to attempt to detect MRS transmitted by one or more candidate ANs for one or more candidate beams and, if one or more conditions that are indicative of the MRS search being unsuccessful are met, transmit an indication that the MRS search was unsuccessful.

In some embodiments, a UE that transmits and/or receives to and/or from a source AN on a source beam comprises a MRS searching module operable to perform a MRS search to attempt to detect MRS transmitted by one or more candidate ANs for one or more candidate beams, and a transmitting module operable to transmit an indication that the MRS search was unsuccessful if one or more conditions that are indicative of the MRS search being unsuccessful are met.

Embodiments of a method of operation of a source AN that transmits and/or receives to and/or from a UE on a source beam are also disclosed. In some embodiments, the method of operation of the source AN comprises configuring the UE with an uplink signal to be transmitted by the UE to trigger transmission of beam-formed MRS by one or more candidate ANs.

In some embodiments, the uplink signal is a USS. In some embodiments, the USS is a random access preamble.

In some embodiments, the method further comprises negotiating with the one or more candidate ANs to determine the uplink signal to be used by the UE to trigger transmission of beam-formed MRS by the one or more candidate ANs.

In some embodiments, the method further comprises receiving a report from the UE where the report comprises an indication of a MSR detected by the UE, determining a candidate AN of the one or more candidate ANs that transmitted the MSR detected by the UE, and initiating a beam switch for the UE from the source beam to a target beam provided by the candidate AN.

Embodiments of a source AN that transmits and/or receives to and/or from a UE on a source beam are also disclosed. In some embodiments, the source AN is adapted to configure the UE with an uplink signal to be transmitted by the UE to trigger transmission of beam-formed MRS by one or more candidate ANs. Further, in some embodiments, the source AN is further adapted to operate according to the method of operation of a source AN according to any of the embodiments disclosed herein.

In some embodiments, a source AN that transmits and/or receives to and/or from a UE on a source beam comprises at least one processor and memory storing instructions executable by the at least one processor whereby the source AN is operable to configure the UE with an uplink signal to be transmitted by the UE to trigger transmission of beam-formed MRS by one or more candidate ANs.

In some embodiments, a source AN that transmits and/or receives to and/or from a UE on a source beam comprises a configuring module operable to configure the UE with an uplink signal to be transmitted by the UE to trigger transmission of beam-formed MRS by one or more candidate ANs.

In some other embodiments, a method of operation of a source AN that transmits and/or receives to and/or from a UE on a source beam comprises receiving an indication from the UE that a MRS search performed by the UE to attempt to detect MRS transmitted by one or more candidate ANs for one or more candidate beams was unsuccessful and, upon receiving the indication, instructing at least one candidate AN to temporarily increase MRS transmit power.

In some embodiments, a source AN that transmits and/or receives to and/or from a UE on a source beam is adapted to receive an indication from the UE that a MRS search performed by the UE to attempt to detect MRS transmitted by one or more candidate ANs for one or more candidate beams was unsuccessful and, upon receiving the indication, instruct at least one candidate AN to temporarily increase MRS transmit power.

In some embodiments, a source AN that transmits and/or receives to and/or from a UE on a source beam comprises at least one processor and memory storing instructions executable by the at least one processor whereby the source AN is operable to receive an indication from the UE that a MRS search performed by the UE to attempt to detect MRS transmitted by one or more candidate ANs for one or more candidate beams was unsuccessful and, upon receiving the indication, instruct at least one candidate AN to temporarily increase MRS transmit power.

In some embodiments, a source AN that transmits and/or receives to and/or from a UE on a source beam comprises an indication receiving module operable to receive an indication from the UE that a MRS search performed by the UE to attempt to detect MRS transmitted by one or more candidate ANs for one or more candidate beams was unsuccessful and an instructing module operable to instruct at least one candidate AN to temporarily increase MRS transmit power upon reception of the indication by the indication receiving module.

Embodiments of a method of operation of a candidate AN for handover of a UE are also disclosed. In some embodiments, the method of operation of the candidate AN comprises detecting an uplink signal transmitted by the UE and, upon detecting the uplink signal transmitted by the UE, transmitting a MRS with beamforming in a direction from which the uplink signal was received from the UE.

In some embodiments, the uplink signal is an uplink signal configured for the UE to trigger transmission of beam-formed MRS by one or more candidate ANs. In some embodiments, the uplink signal is a USS. In some embodiments, the USS is a random access preamble.

Embodiments of a candidate AN for handover of a UE are also disclosed. In some embodiments, the candidate AN is adapted to detect an uplink signal transmitted by the UE and, upon detecting the uplink signal transmitted by the UE, transmit a MRS with beamforming in a direction from which the uplink signal was received from the UE. In some embodiments, the candidate AN is further adapted to operate according to the method of operation of a candidate AN according to any of the embodiments disclosed herein.

In some embodiments, a candidate AN for handover of a UE comprises at least one processor and memory storing instructions executable by the at least one processor whereby the candidate AN is operable to detect an uplink signal transmitted by the UE and, upon detecting the uplink signal transmitted by the UE, transmit a MRS with beamforming in a direction from which the uplink signal was received from the UE.

In some embodiments, a candidate AN for handover of a UE comprises a detecting module operable to detect an uplink signal transmitted by the UE and a transmitting module operable to transmit a MRS with beamforming in a direction from which the uplink signal was received from the UE upon detection of the uplink signal transmitted by the UE by the detecting module.

In some embodiments, a method of operation of a candidate AN for beam-switch for a UE from a source beam to a candidate beam served by the candidate AN comprises receiving an instruction from a source AN that serves the source beam of the UE to temporarily increase MRS transmit power and temporarily increasing MRS transmit power at the candidate AN upon receiving the instruction.

In some embodiments, a candidate AN for beam-switch for a UE from a source beam to a candidate beam served by the candidate AN is adapted to receive an instruction from a source AN that serves the source beam of the UE to temporarily increase MRS transmit power and temporarily increase MRS transmit power at the candidate AN upon receiving the instruction.

In some embodiments, a candidate AN for beam-switch for a UE from a source beam to a candidate beam served by the candidate AN comprises at least one processor and memory storing instructions executable by the at least one processor whereby the candidate AN is operable to receive an instruction from a source AN that serves the source beam of the UE to temporarily increase MRS transmit power and temporarily increase MRS transmit power at the candidate AN upon receiving the instruction.

In some embodiments, a candidate AN for beam-switch for a UE from a source beam to a candidate beam served by the candidate AN comprises an instruction receiving module operable to receive an instruction from a source AN that serves the source beam of the UE to temporarily increase MRS transmit power and a MRS transmit power increasing module operable to temporarily increase MRS transmit power at the candidate AN upon receiving the instruction.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
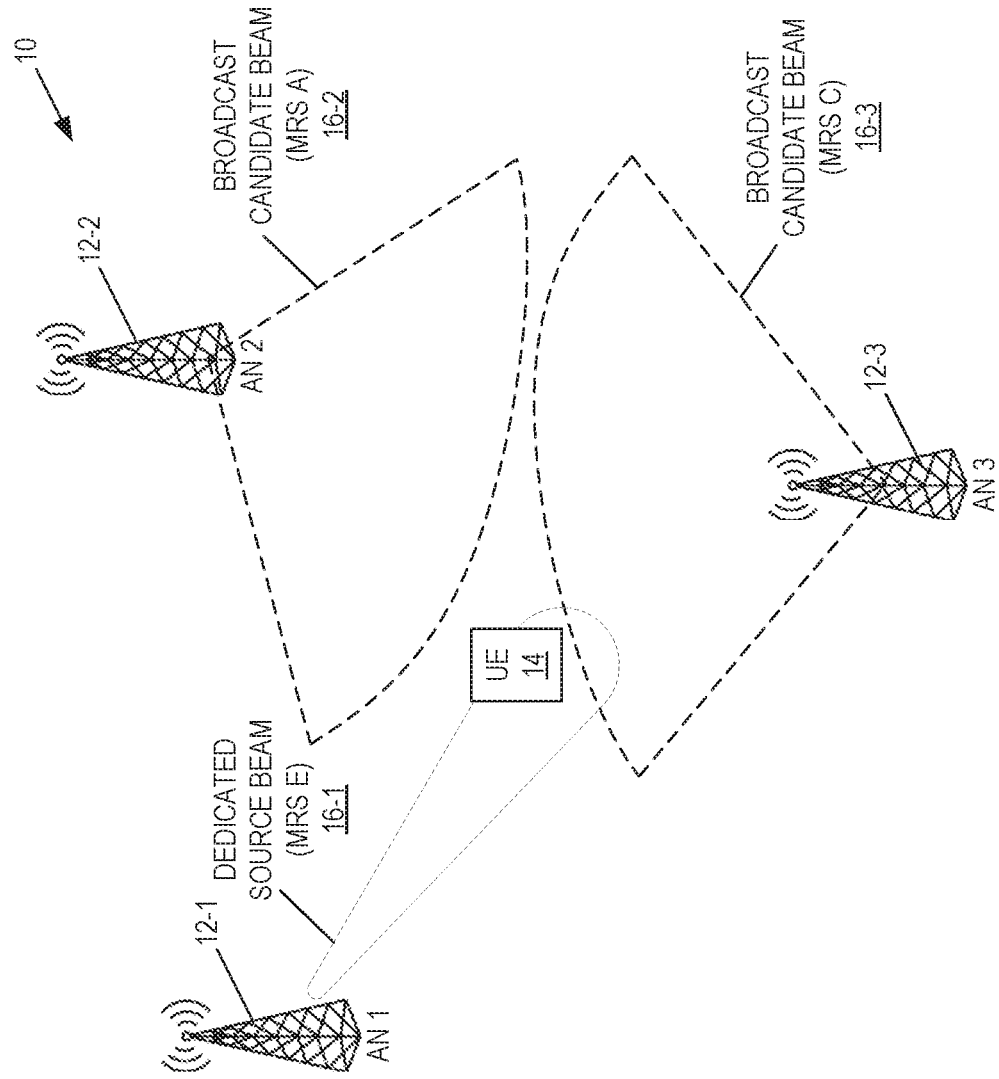
FIG. 1 illustrates one example of a wireless system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Antenna Node (AN): As used herein, an "antenna node" or "AN" is a unit capable of producing one or more beams covering a specific area or direction. An AN can be a base station, or part of a base station.

User Equipment (UE): As used herein, a "UE" is any type of wireless device that has access to, i.e., is served by, a cellular communications network by wirelessly transmitting and/or receiving signals to an AN. Some examples of a UE include, but are not limited to, a mobile phone, a tablet computer, and a Machine Type Communication (MTC) device.

Note that the description given herein focuses on a Third Generation Partnership Project (3GPP) cellular communications system and, as such, 3GPP terminology or terminology similar to 3GPP terminology is oftentimes used. However, the concepts disclosed herein are not limited to a 3GPP system.

UE Dedicated Source Beam or Source Beam: As used herein, a "UE dedicated source beam" or "source beam" is the beam-formed beam that maximizes the energy radiated towards the UE and is currently in use when sending/receiving data to/from the UE.

UE Dedicated Candidate Beam or Target Beam or Neighbor Beam: As used herein, a "dedicated candidate beam" or a "target beam" or a "neighbor beam" is a beam-formed antenna radiation pattern not yet used for sending/receiving the data to/from the UE. This beam does not normally exist until the UE is actually there and the beamforming mechanisms have shaped the beam to match the UE position, which may be a geo position and/or a radio position.

Broadcasted Source Beam: As used herein, a "broadcasted source beam" is the beam used by a source AN to communicate with any or all UEs located within a respective area.

Broadcasted Candidate Beam: As used herein, a "broadcasted candidate beam" is the beam used by a candidate AN to communicate with any or all UEs located within a respective area.

Mobility Reference Signal (MRS): As used herein, a "MRS" is any signal used for mobility measurements. Thus, while the term "MRS" is used herein to refer to a signal used in embodiments of the present disclosure, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purpose. This signal can be periodic or aperiodic. It can be configured to be UE specific or could be used in common for more than one UE. The MRS is coded to allow a UE to differentiate one MRS from another, where an index is one such way of coding the MRS. For example, the MRS may be unique for a certain index. In some particular embodiments, the MRS design and potentially functionality is similar to that of the Primary Synchronization Signal (PSS)/Secondary Synchronization Signal (SSS) in 3GPP Long Term Evolution (LTE). Note that the terms "mobility reference signal" and "measurement reference signal" are used interchangeably herein.

Uplink Synchronization Signal (USS): As used herein, a "USS" is any uplink synchronization signal used to, e.g., provide channel quality estimation in the uplink and/or synchronization. Notably, while the term "USS" is used herein to refer to such a synchronization signal, the term "USS" is to be construed broadly to mean any signal, regardless of what the signal is named, e.g., in any particular standard, used for uplink synchronization and, in particular, used according to the embodiments described herein. In some embodiments, the USS is used for uplink timing advance calculation, uplink frequency offset estimation, and/or uplink beam identification. In some embodiments, the USS is a random access preamble (e.g., the same as or similar to the Physical Random Access Channel (PRACH) preamble in LTE). In some embodiments, the USS maps to a particular MRS. For example, USS timing may map to MRS timing and/or USS sequence maps to MRS sequence.

The present disclosure is related to cellular networks, e.g., the Fifth Generation (5G) of cellular networks, and in particular to how to efficiently handle beam switching mobility at poor coverage. It should be noted that while the term "beam switching" is sometimes used herein, beam switching may interchangeably be referred to as handover, node switching, access point switching, or the like.

Beamforming introduces the possibility to enhance the signal towards a specific location. This enables better signal to noise ratio towards a specific UE and better interference isolation towards a UE served by another beam.

Some services are not UE specific, i.e. they need to serve a number of UEs that are not located in the exact same position. These services will use beams that are not so concentrated towards a specific UE but cover a wider area instead.

The above scenario creates a difference in how a UE perceives a broadcasted service compared to a service dedicated to a single UE. Some of the difference can be reduced by using less effective but more robust modulations for the broadcasted services. Broadcasted services are widely used in today's mobile radio networks to determine when and towards what mobility action should be performed. An example is cell measurements in LTE. In systems like 5G where beamforming will be heavily used, the difference of broadcasted and dedicated services will make it harder to compare and determine when and towards what mobility actions should be performed.

In this solution the radio system can identify and prevent potential radio link failure at beam switch mobility by compensating for the difference in signal strength from the UE dedicated signaling compared to the signaling used for broadcast services like those used for mobility measurements. In particular, the radio system can compensate for the difference in signal strength from a beam-formed UE specific reference signal for, e.g., Demodulation Reference Signal (DMRS) resulting in the improved amount of energy radiated towards the UE compared to that of a MRS which uses a beamforming not specific for the location of a specific UE. That is, the MRS is a broadcast beam.

When a beam switch is desired for a specific UE currently served by a source beam, a number of candidate beams must be measured by the UE before proceeding with the beam switch to make sure that a target beam selected for the beam switch is not worse than the source beam. However, since the difference between a dedicated beam to this UE and a broadcasted beam that is used to indicate a mobility area for the candidate beams and since the UE might not even be able to hear the broadcasted candidate beams, it is very difficult for the UE to decide whether or not to perform the beam switch, since it is very difficult for the UE to determine the broadcasted candidate beam's relation to a fully beam-formed dedicated candidate beam in the same antenna node.

In some embodiments, the solution is to provide the UE with a configuration of a USS that can be sent that will in turn initiate another MRS transmission which will be as beam-formed as possible based on the received USS signal. In some embodiments, the USS is similar to the Sounding Reference Signal (SRS) and/or the PRACH preamble in LTE. The beam-formed MRS can then be compared with the beam-formed, dedicated source beam. A UE configuration or activation containing details about USS to be used and how long to wait before initiating transmission of the USS will be applied before the beam switch attempt. Note that normally the USS should be avoided since it will pollute radio conditions. This can also be combined by informing the candidate beams about this UE and which USS the UE will use if the timer expires based on a threshold configured by the source beam. The candidate beams can use the received USS to beam form a specific MRS (or use the same MRS as previously used in the wide beam broadcasting).

Using embodiments of the present disclosure provides the following non-limiting advantages:
  Improves beam switch mobility success rate at least in certain scenarios
  Improves selection of best candidate beam at beam switch mobility
  The ability to handle differences in coverage between source and target beams that is caused by unfair beam-forming comparison
  Reduces drop risk and associated increased signaling in the Radio Access Network (RAN)
  Reduces the need to have permanent high output power for broadcast services such as MRS.

FIG. 1 illustrates one example of a wireless system 10, which may also be referred to herein as a radio system 10, in which embodiments of the present disclosure may be implemented. As illustrated, the wireless system 10 includes a number of ANs 12-1 through 12-3 that operate to provide wireless access to UEs, such as UE 14. In this particular example, the UE 14 transmits and/or receives signals, e.g., data signals and/or control signals, to the AN 12-1 via a UE dedicated source beam 16-1. The UE dedicated source beam 16-1 is also referred to herein as the source beam 16-1 of the UE 14. A MRS is transmitted to the UE 14 on the source beam 16-1. As such, this MRS is referred to herein as a beam-formed MRS, i.e., a MRS that is transmitted on the UE dedicated source beam 16-1. This MRS is referred to in FIG. 1 as MRS E.

Embodiments of the present disclosure relate to beam switching, i.e., handover of the UE 14 from the source beam 16-1 to a target beam. In this regard, ANs 16-2 and 16-3 transmit respective MRSs, which are referred to as MRS A and MRS C, on broadcast candidate beams 16-2 and 16-3, respectively. However, a problem arises from the fact that the MRSs A and C are transmitted on the broadcast candidate beams 16-2 and 16-3, whereas the source beam 16-1 is a beam-formed, UE dedicated beam. In particular, in some scenarios, the UE 14 may not be able to detect the MRSs transmitted on the broadcast candidate beams 16-2 and 16-3.

In other scenarios, even if the UE 14 is able to detect the MRSs transmitted on the broadcast candidate beams 16-2 and 16-3, the received power of the MRSs may be too low to trigger a beam switch. Embodiments of the present disclosure address this problem.

In embodiments of the present disclosure, a radio system, such as the wireless system 10, can identify and prevent radio link failure and failed handover by compensating the difference in: (a) signal strength from UE dedicated beam signaling, i.e., a beam-formed UE specific reference signal for, e.g., DMRS and (b) signal strength from signaling used for broadcast services such as those used for mobility measurements, i.e., MRS. In other words, the wireless system 10 compensates for the difference in: (a) the signal strength at the UE 14 for the source beam 16-1, i.e., the signal strength at the UE 14 for a beam-formed UE specific reference signal, e.g., DMRS, received at the UE 14 on the source beam 16-1 and (b) the signal strength at the UE 14 for the MRSs received at the UE 14, if at all, on the broadcast candidate beams 16-2 and 16-3. The difference can occur since the dedicated signaling strives to maximize the amount of energy radiated towards the UE 14, whereas the broadcasting signal normally uses a beamforming that is not specific for the location of a specific UE but rather covers a larger area serving many UEs.

Also, when a beam switch is imminent, the dedicated signaling in the source beam has a much better link adaptation achieved using beamforming than the candidate beams 16-2 and 16-3, which have not yet performed link adaption, i.e., beamforming, towards the UE 14. The broadcast candidate beams 16-2 and 16-3 are identified by sending MRSs, and the UE 14 reports back the best candidate or replies with a USS matching the selected MRS, which also can allow the beam switch to occur. The latter case considers a scenario where each MRS is mapped towards a specific USS, allowing the system to use the USS as a trigger to perform the beam switch, i.e. when the AN sending the broadcast candidate beam of a certain MRS hears a certain USS, it will use this as a handover trigger.

There are however some scenarios where the MRS transmitted on the broadcast candidate beams 16-2 and/or 16-3 is too low or not detected by the UE 14 at all, which prevents any beam switch and, in the worst case, will result in a radio link failure for the UE 14, which will cause unwanted interruption in the data transfer and also increase the signal load on the RAN and resource allocation when the UE 14 tries to reconnect.

One scenario is that the UE 14 is about to go out of coverage of one AN, as reported by measurement or detected by the UE dedicated source beam 16-1 using reciprocity. More specifically, the UE 14 is about to go out of coverage of the AN 12-1 corresponding to the source beam 16-1, which is referred to herein as the source AN 12-1. The UE 14 is then configured to search for a new candidate beam using a MRS search. Alternatively, the UE 14 may have already been configured using threshold values when to start candidate measurements.

Figure 2:
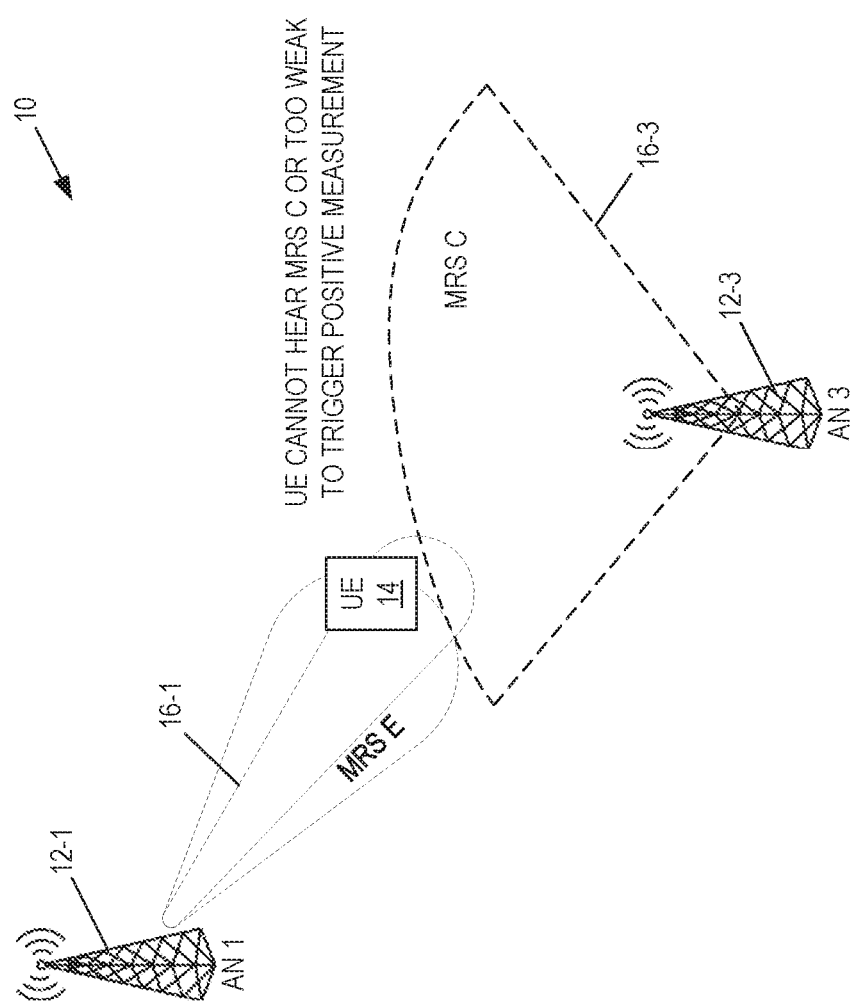
FIG. 2 illustrates a scenario in which a User Equipment device (UE) is getting worse coverage (than a threshold) of a UE dedicated source beam but cannot detect a broadcasted candidate beam (Mobility Reference Signal (MRS) C)

A problem occurs if the UE 14 only detects a too low MRS or does not detect a broadcasted candidate beam 16-2 or 16-3, i.e., MRS, not including the MRS sent from the same AN 12-1 as the dedicated source beam 16-1, at all. A "too low MRS" is MRS having a receive signal strength or quality at the UE 14 that is less than a predefined or preconfigured threshold. For example, FIG. 2 illustrates a scenario in which the UE 14 is getting worse coverage than a threshold of the UE dedicated source beam 16-1 but cannot detect the broadcasted candidate beam, which in this example is MRS C. The present disclosure describes two options for addressing this problem. Various embodiments of these two options are described below. Note that the dashed line around the dedicated source beam 16-1 shows the coverage and beamforming of the dedicated source beam 16-1.

Option 1

Figure 3:
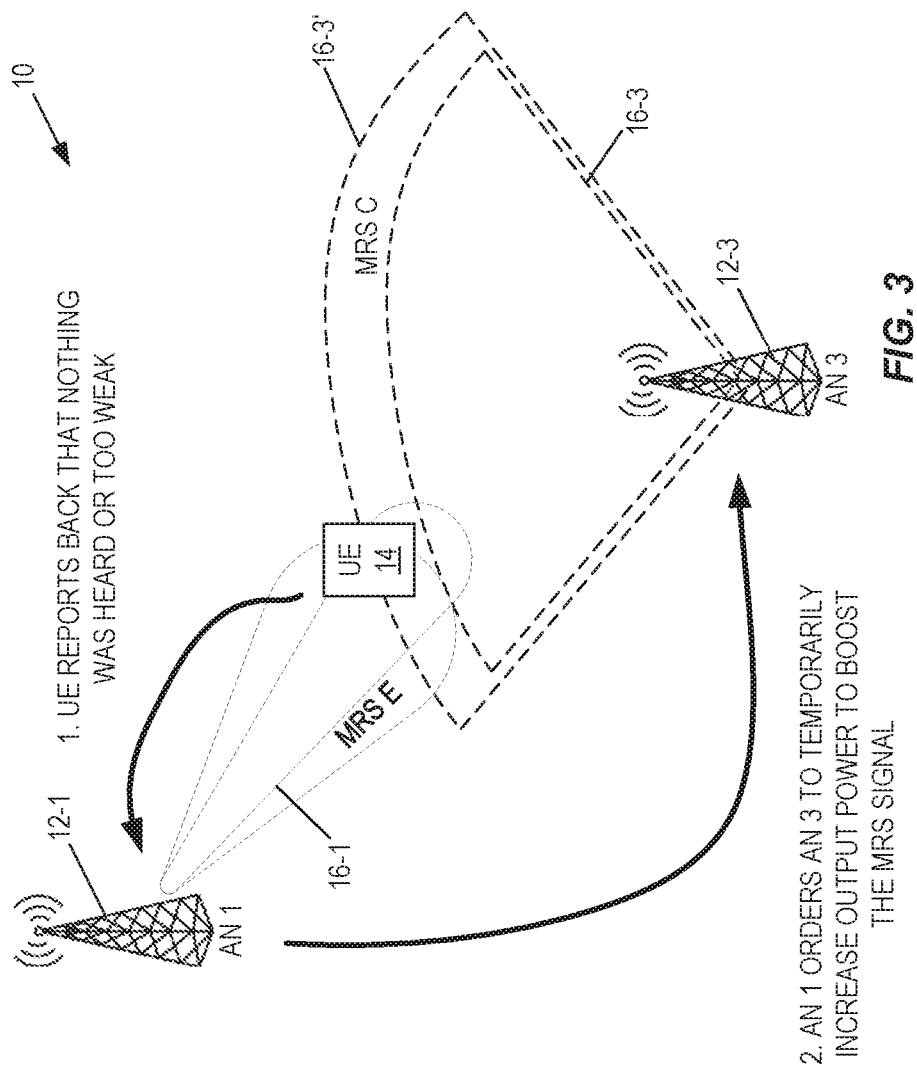
FIG. 3 illustrates the operation a wireless network in which a UE reports zero detected MRSs or only MRSs having too low values, and then a respective Antenna Node (AN), upon receiving the report from the UE, informs, or instructs, one or more other ANs (e.g., neighboring ANs) to temporarily increase output power for MRS transmission, according to some embodiments of the present disclosure.

Option 1 is illustrated in FIG. 3. After a period of time, which may, for example, be configured in the UE 14, has expired since starting the MRS search, the UE 14 reports back over the UE dedicated source beam 16-1 with zero results or as another option reports back that any heard MRS are too low signals. In other words, the UE 14 reports either that it did not detect any MRS or that any detected MRSs are too weak. A detected MRS is considered too weak if, for example, a Signal to Interference plus Noise Ratio (SINR) or received signal strength/quality value of the detected MRS is below a predefined or preconfigured threshold. The AN 12-1 serving the UE dedicated source beam 16-1, which is referred to herein as the source beam AN, can then order, or instruct, one or more other ANs such as, e.g., one or more neighbor ANs such as AN 12-3 in the illustrated example to increase output power on the MRS transmission or, in other words, to increase the MRS transmit power on the broadcast candidate beam 16-3. The instruction to increase the MRS transmit power is, at least in some embodiments, an instruction to temporarily increase in the MRS transmit power. The temporary increase in MRS transmit power may be, e.g., at least long enough to allow the UE 14 to make a new measurement with some margin. As an example, in, e.g., New Radio Access Technology (RAT) (NR), a single MRS transmission may be enough, which means that the temporary increase in MRS transmit power is a few milliseconds, but, if a more robust time-to-trigger is desired, the temporary increase in MRS transmit power may last a few hundred milliseconds. Once the temporary increase in MRS transmit power is triggered, the UE 14 will either continue the MRS search/measurement, e.g., even after delivery of the failed report that triggered the instruction to increase MRS transmit power, or the source AN 12-1 may order the UE 14 to perform a new MRS search/measurement when the candidate AN(s), e.g., the AN 12-2 and/or 12-3, are instructed to increase MRS transmit power.

In alternative embodiment, if the source AN 12-1 ordered a measurement, the lack of a response from the UE 14 could trigger the order from the source AN 12-1 to the candidate AN(s) 12-2 and/or 12-3 to increase MRS transmission power. The source AN 12-1 corresponds to AN 1 in the example of FIG. 3, and the candidate AN(s) 12-2 and/or 12-3 correspond to AN 3 in the example of FIG. 3.

Figure 4:
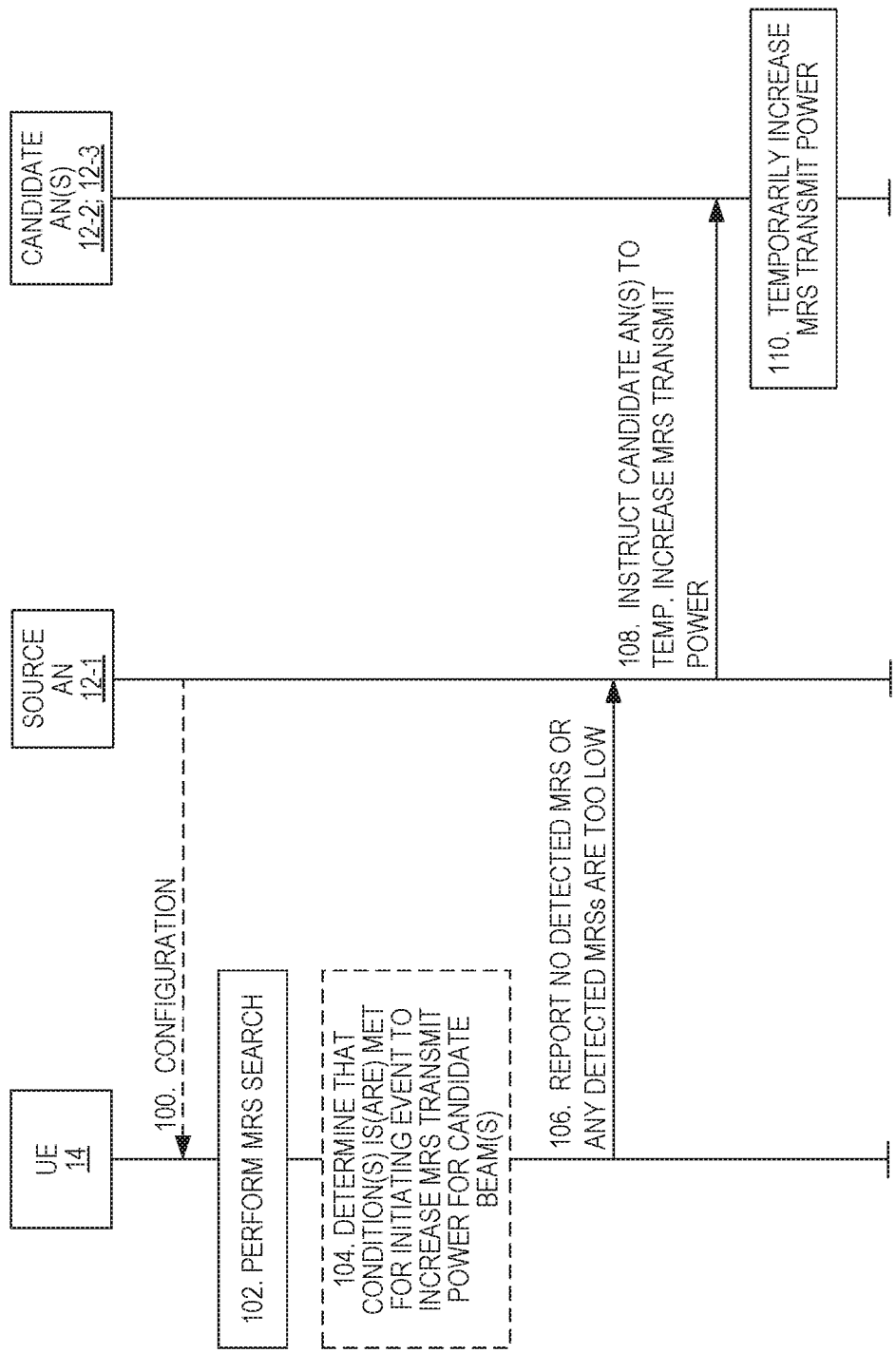
FIG. 4 is a diagram that illustrates a process in which a UE, a source AN, and one or more candidate ANs operate as described with respect to FIG. 3 according to some embodiments of the present disclosure.

FIG. 4 illustrates the operation of a UE 14, a source AN 12-1, and one or more candidate ANs 16-2, 16-3 for Option 1 according to some embodiments of the present disclosure. Optional steps are indicated by dashed lines. Note that, as used herein, a "source AN" is an AN associated with a source beam, whereas a "candidate AN" is an AN associated with a candidate beam. As illustrated, the source AN 12-1 optionally configures the UE 14 to perform a MRS search (step 100). This configuration may include, for example, a timer value to be used by the UE 14 to determine when to trigger the report in step 106 below. This configuration may also include, for example, the matching USS information to the MRSs of the candidate beams.

At some point in time, the UE 14 performs a MRS search to, e.g., determine whether there are any suitable candidate beams for a beam switch (step 102). For example, the UE 14 searches for MRS having a received signal strength that is greater than a predefined or preconfigured threshold. This threshold may be configured, e.g., in step 100. Optionally, the UE 14 determines that one or more conditions are met for initiating an event to cause candidate AN(s) 16-2, 16-3 to increase MRS transmit power (step 104). These conditions may include, for example, the expiration of a timer, which may be configured with a timer value, e.g., in step 100, before detection of a MRS or before detection of a MRS having a SINR that is greater than a predefined or preconfigured threshold. Note that SINR is only an example. Any other signal strength or signal quality value may be used. If the condition(s) are met, then the UE 14 sends a report to the source AN 12-1 that indicates either that no MRSs were detected by the UE 14 or that any MRS(s) detected by the UE 14 are too low/weak, e.g., have SINR values that are less than the predefined or preconfigured value (step 106). Upon receiving the report, the source AN 12-1 instructs the one or more candidate ANs 12-2, 12-3 to increase their MRS transmit power (step 108). The one or more candidate ANs 12-2, 12-3 may be, for example, one or more neighbor ANs. This instruction is, at least in some embodiments, an instruction to temporarily increase their MRS transmit power. In response, the candidate AN(s) 12-2, 12-3 temporarily increase MRS transmit power (step 110).

As will be appreciated by one of ordinary skill in the art, upon transmitting their MRSs on the broadcast candidate beams 16-2, 16-3 with the increased transmit power, at least one of the MRSs may be detected by the UE 14 with a received power that is greater than the predefined or preconfigured threshold. The UE 14 reports the detected MRS(s) and, in some embodiments, an indication of the received power or quality of the detected MRS(s) to the source AN 12-1. The source AN 12-1 then initiates a beam switch for the UE 14 from the source beam 16-1 to a selected or best MRS from the MRS(s) reported by the UE 14.

Option 2

Figure 5:
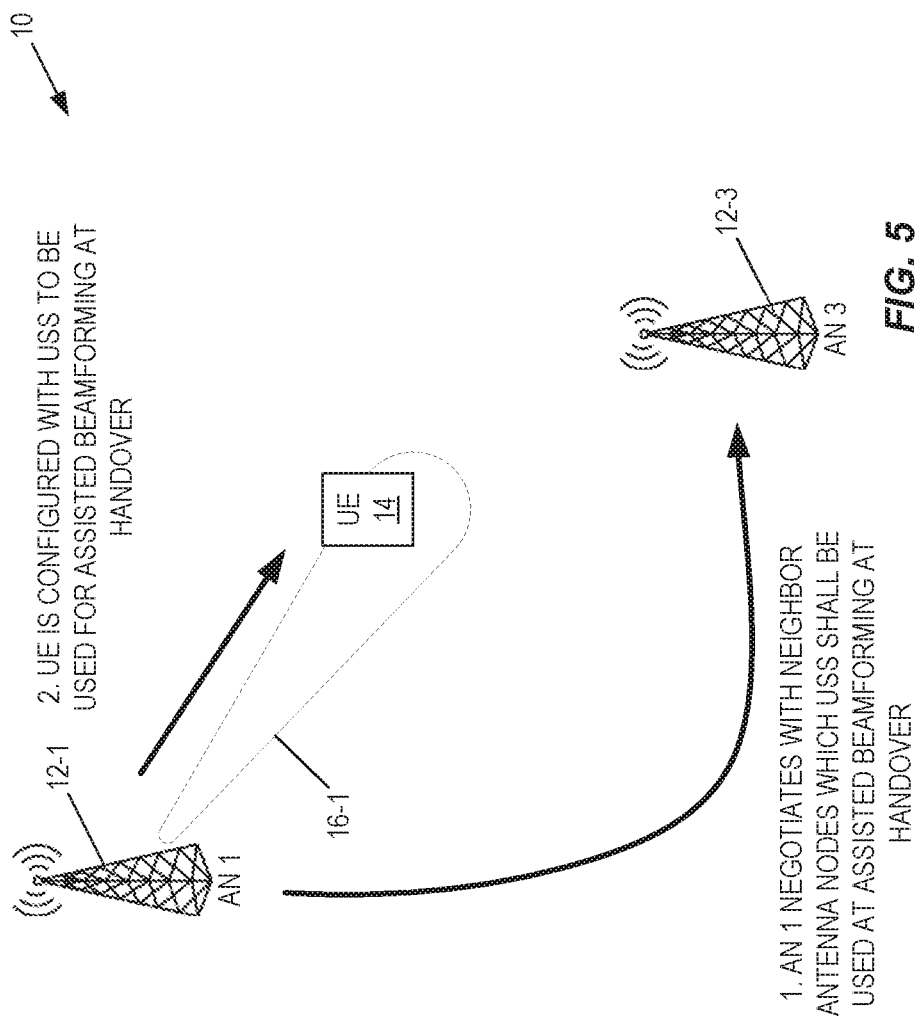
FIG. 5 illustrates the operation of ANs to negotiation a Uplink Synchronization Signal (USS) for assisted MRS beamforming for a UE according to some embodiments of the present disclosure.
Figure 6:
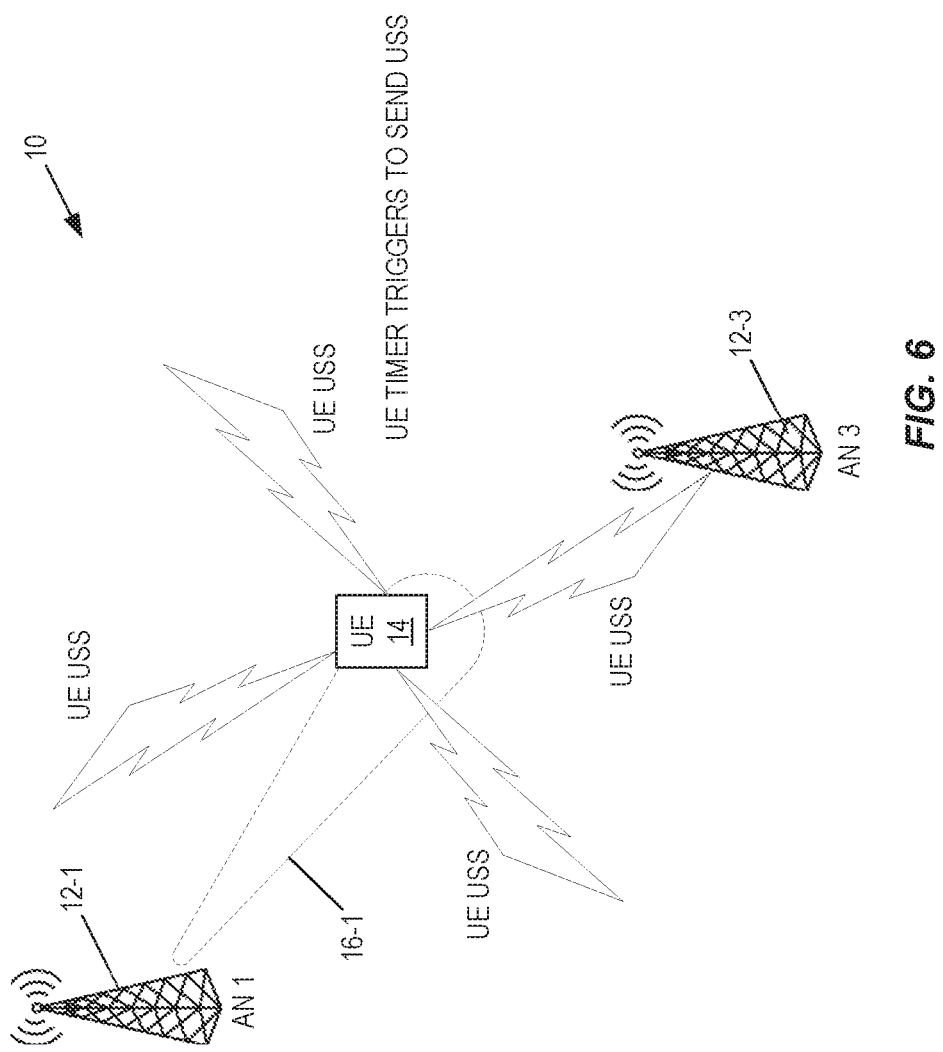
FIG. 6 illustrates the operation of a UE to transmit a USS to initiate transmission of a beam-formed MRS by one or more candidate ANs according to some embodiments of the present disclosure.
Figure 7:
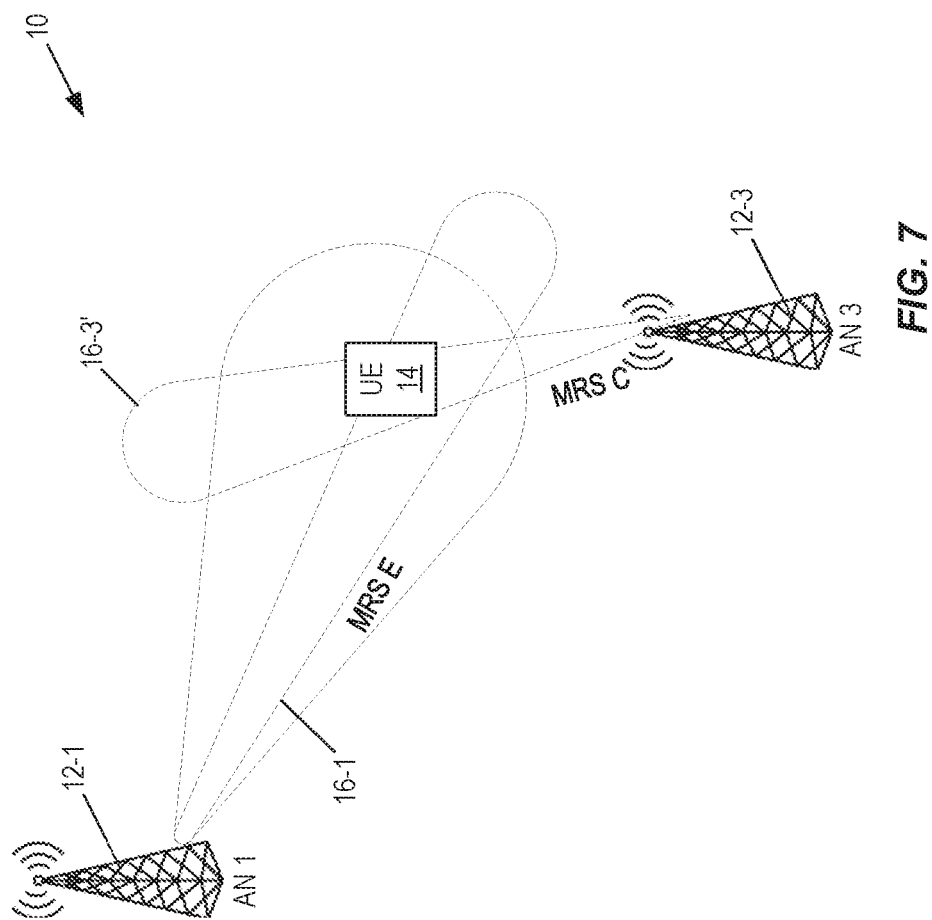
FIG. 7 illustrates the operation of an AN to transmit a beam-formed MRS in the perceived direction of the UE upon receiving the USS from the UE according to some embodiments of the present disclosure.

Aspects of Option 2 are illustrated in FIGS. 5, 6, and 7. FIG. 5 illustrates a negotiation process between ANs to determine a USS to be used by the UE 14 to trigger assisted beam-forming of MRSs. In the illustrated example, the negotiation process is between the ANs 12-1 and 12-3. As illustrated, the source AN 12-1 and a neighbor AN 16-3, in this example, negotiate a USS to be used by the UE 14 to trigger assisted beam-forming of MRS. The source AN 12-1 then configures the UE 14 with the USS to be used by the UE 14 to trigger assisted beam-forming of MRS.

FIG. 6 illustrates transmission of the configured USS by the UE 14 to trigger transmission of assisted beam-formed MRS(s) by a candidate AN(s), which is or includes the AN 12-3 in this example. As illustrated, upon determining that it is to trigger transmission of assisted beam-formed MRS by the candidate AN(s), the UE 14 transmits the configured USS. In this example, the UE 14 determines that it is to trigger transmission of assisted beam-formed MRS by the candidate AN(s) upon expiration of a timer after the start of a MRS search without the UE 14 detecting any MRSs or without the UE 14 detecting any MRSs having a received power or quality, e.g., received SINR, that is greater than a predefined or preconfigured threshold.

FIG. 7 illustrates the transmission of the beam-formed MRS by the candidate AN 12-3 upon receiving the USS from the UE 14. As illustrated, upon receiving the USS from the UE 14, the candidate AN 12-3 transmits the MRS (MRS C) with beam-forming in the direction from which the USS was received from the UE 14. In other words, the candidate AN 12-3 transmits the MRS (MRS C) on a UE dedicated candidate beam 16-3' that is in the direction from which the USS was received from the UE 14.

In operation, after a period of time has expired since the start of the MRS search, the UE 14 sends a USS that is configured for the UE 14 and is not associated to any MRS to trigger transmission of beam-formed MRSs by a candidate AN(s), e.g., AN 12-2 and/or AN 12-3. The beam-formed MRS transmitted by a candidate AN is also referred to herein as a MRS transmitted on a UE dedicated candidate beam. Each AN other than the source AN 12-1 that receives the USS from the UE 14 transmits a beam-formed MRS in the same direction from which the USS was received using a refined beam than the one used for normal MRS transmissions. The direction from which the USS was received can be determined based on channel estimation using the received USS. Upon reception of the MRS transmission at the UE 14, the UE 14 can either: (a) report back a detected, e.g., best, MRS to the source AN 12-1, where the source AN 12-1 can then try to resolve which candidate AN, or which neighbor AN, transmitted that MRS and initiate a beam switch to that candidate AN; or (b) transmit a USS that matches the detected, e.g., best, MRS to the candidate AN and from there perform the beam switch. Note that (a) is referred to herein as "Option 2a" and (b) is referred to herein as "Option 2b."

The UE beam search can be configured or activated. The UE beam search is also referred to herein as the MRS search. As part of the configuration or activation, a specific USS to be used if no MRS is heard can be assigned to the UE 14. The source AN 12-1 can inform the candidate ANs 12-2 and 12-3 about which USS will be used by the UE 14 to trigger assisted beam-forming of MRS (if no sufficient MRS is heard); and optionally which MRS should be sent as a reply to this specific USS. Again, the candidate ANs 12-2 and 12-3 are, in some examples, neighbor ANs that provide the candidate, e.g., neighbor, beams.

In Option 2, the configuration step as illustrated in, e.g., FIG. 5 as well as FIGS. 8 and 9 described below, can be used for the configuration of USS which is to trigger assisted beam-forming of MRS, e.g., in case of Active Mode Mobility (AMM) when the UE 14 is in RRC_CONNECTED mode. This is because the USS resource used for this process must be unique or orthogonal to the USS resources reserved by the neighboring nodes based on their MRS to USS mapping, which is used for, e.g., regular beam switching, in order to avoid a possible misinterpretation of detected USS. The USS used for the purpose of the present disclosure does not have to be unique amongst all UEs since the purpose is just to inform nodes that hear the USS to temporarily beam form their MRS in this direction, but it can be unique if required by a certain scenario.

Note that in some AMM schemes a certain USS maps to a certain MRS and the UE 14 can perform access towards a new node using the USS that corresponds to its MRS. Thus, if a USS is mapped towards a certain MRS, then the AN will know which MRS the UE 14 is responding towards. For example, if USSs 1 to 3 are mapped to MRSs 1 to 3 and if the UE 14 hears MRSs 1 to 3 but MRS 2 is the best, the UE 14 will reply with USS 2. Then, the AN sending MRS 2 knows that this USS was intended for it. Also, the ANs sending MRSs 1 and 3 know that this USS was not intended for them.

Figure 8:
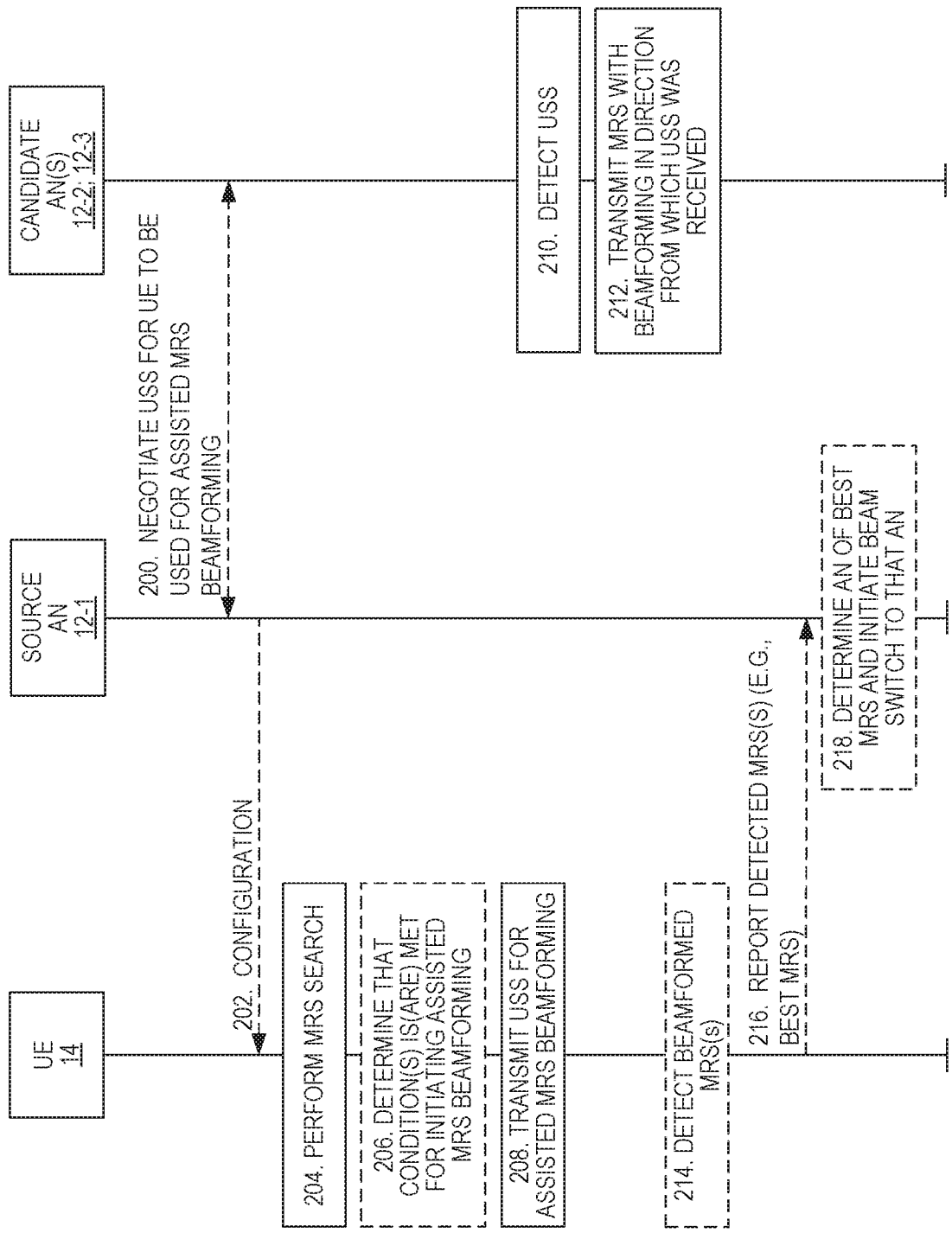
FIGS. 8 and 9 illustrate the operation of a UE, the source AN, and one or more candidate ANs to provide beam switching according to some embodiments of the present disclosure.

FIG. 8 illustrates the operation of a UE 14, a source AN 12-1, and one or more candidate ANs 12-2, 12-3 for Option 2a according to some embodiments of the present disclosure. Optional steps are indicated by dashed lines. As illustrated, optionally, the source AN 12-1 and one or more candidate ANs 12-2 and/or 12-3 negotiate a USS for the UE 14 (step 200). This USS is the USS, or USS resource, to be used by the UE 14 to trigger assisted beam-forming of MRS by the candidate AN(s) 12-2 and/or 12-3. Also, the source AN 12-1 optionally configures the UE 14 (step 202). This configuration may include, for example, the USS to be used by the UE 14 to trigger assisted beam-forming of MRS. In addition or alternatively, this configuration may also include, for example, the matching of USS information to the MRSs of the candidate beams. The configuration may also include a timer value to be used by the UE 14 to determine when to trigger transmission of the USS in step 208 below.

At some point in time, the UE 14 performs a MRS search to, e.g., determine whether there are any suitable candidate beams for a beam switch (step 204). Optionally, the UE 14 determines that one or more conditions are met for initiating assisted MRS beamforming (step 206). This condition(s) may include, for example, the expiration of a timer configured with a timer value, e.g., in step 202 before detection of a MRS or before detection of a MRS having a SINR or other signal strength or signal quality value that is greater than a predefined or preconfigured threshold. If the condition(s) is(are) met, then the UE 14 transmits the USS to trigger assisted MRS beamforming (step 208).

The candidate AN(s) 12-2 and/or 12-3 detect the USS transmitted by the UE 14 (step 210). Upon detecting the USS transmitted by the UE 14, the candidate AN(s) 12-2 and/or 12-3 transmit MRS with beamforming in a direction from which the USS was received from the UE 14 (step 212). In other words, the candidate AN(s) 12-2 and/or 12-3 transmit beam-formed MRS towards the UE 14 wherein the beamforming is based on the channel estimation carried out with the help of the USS transmitted by the UE 14. In this context, the MRS is referred to as being transmitted on a UE dedicated candidate beam.

The UE 14 optionally detects one or more of the beam-formed MRSs (step 214). In this embodiment, the UE 14 reports a detected MRS to the source AN 12-1 (step 216). The detected MRS reported by the UE 14 is, e.g., the best MRS detected by the UE 14, which may be a beam-formed MRS. In some embodiments, the UE 14 reports that a USS triggered procedure occurred. This information can be used by the source AN 12-1 for statistics but also to evaluate the result with the knowledge that the MRS heard by the UE 14 could have been beam-formed. If the UE 14 does not report this, then it can still be determined by the RAN using information exchange with the candidate AN(s) 12-2, 12-3. The source AN 12-1 can then try to resolve which candidate AN 12-2 or 12-3 transmitted the reported/best MRS and initiates a beam switch to that candidate AN 12-2, 12-3 (step 218).

Figure 9:
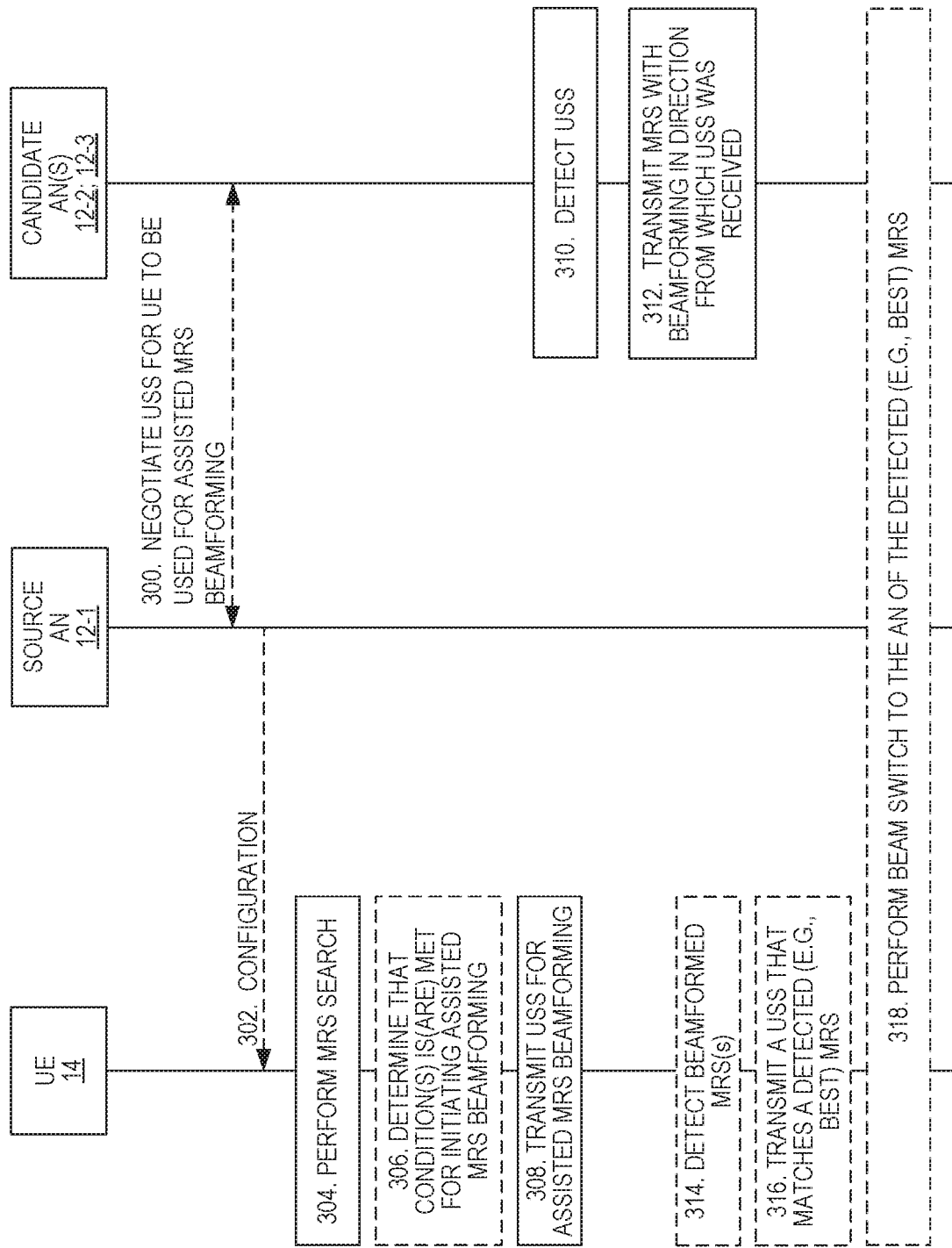

FIG. 9 illustrates the operation of a UE 14, a source AN 12-1, and one or more candidate ANs 12-2 and/or 12-3 for Option 2b according to some embodiments of the present disclosure. Optional steps are indicated by dashed lines. Steps 300 through 314 are the same as steps 200 to 214 of FIG. 8 and, as such, the details of those steps are not repeated.

In this embodiment, upon detecting one or more of the beam-formed MRSs, the UE 14 transmits a USS that matches a detected, e.g., best, beam-formed MRS (step 316). In this manner, the UE 14 replies to the respective candidate AN 12-2 or 12-3. From there, the UE 14, the source AN 12-1, and the candidate AN 12-2 or 12-3 perform the beam switch (step 318). For example, the UE 14 can be configured with candidate AN parameters, e.g., similar to what is done for handover in LTE, or the candidate beam can be allowed to "borrow" the parameters from the source beam and just continue. In the latter case, the UE 14 may not even notice the beam switch. However, these are only examples. The beam switch may be performed using any suitable technique or methodology.

Notable Aspects of Embodiments of the Present Disclosure

Some notable aspects of the present disclosure are as follows:
Configure the UE 14 with a timer and condition when to use USS to be able to beam-form the candidate MRS transmission.
Configure the UE 14 with a USS to be used to initiate beamforming of the MRS transmission at candidate nodes.
Inform neighbor nodes which USS that will be used by a specific UE 14 to allow the target node to proceed to beam-form and send the MRS intended for this UE 14 to continue with the beam switch mobility procedure.
Use a timer and condition to trigger an event to increase output power of the MRS for the candidate beams.

AN and UE Block Diagrams

Figure 10:
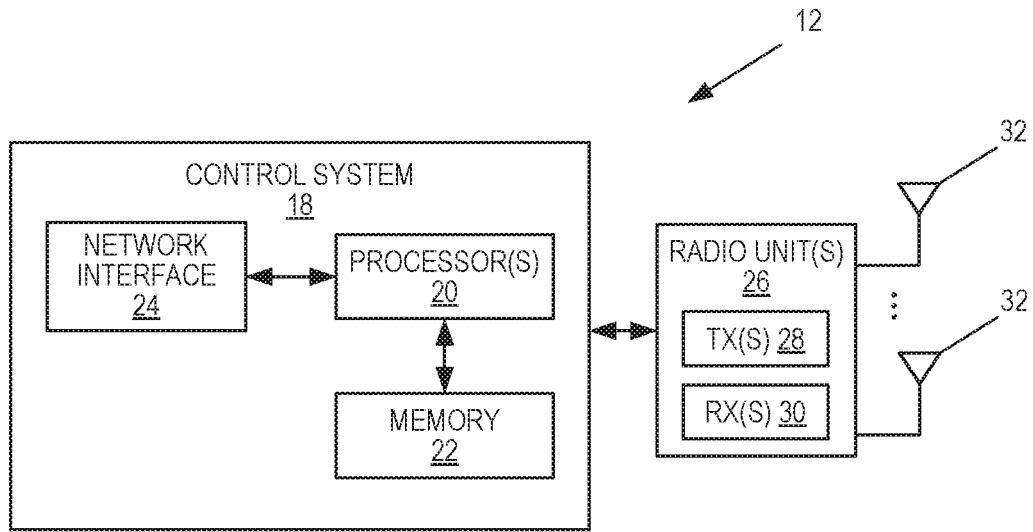
FIGS. 10 to 12 are block diagrams of various embodiments of an AN.

FIG. 10 is a schematic block diagram of an AN 12 according to some embodiments of the present disclosure. The AN 12 can be either the source AN 12-1 or one of the candidate ANs 12-2 and 12-3. As illustrated, the AN 12 includes a control system 18 that includes one or more processors 20, memory 22, and a network interface 24. The one or more processors 20 are, for example, Central Processing Units (CPUs), Application Specific Integrated Circuits (ASICs), Field Programmable Gate Arrays (FPGAs), and/or the like. In addition, the AN 12 includes one or more radio units 26 that each includes one or more transmitters 28 and one or more receivers 30 coupled to one or more antennas 32. In some embodiments, the radio unit(s) 26 is external to the control system 18 and connected to the control system 18 via, e.g., a wired connection such as, for example, an optical cable. However, in some other embodiments, the radio unit(s) 26 and potentially the antenna(s) 32 are integrated together with the control system 18. The one or more processors 20 operate to provide one or more functions of an AN 12 as described herein. In some embodiments, the function(s) are implemented in software that is stored, e.g., in the memory 22 and executed by the one or more processors 20.

Figure 11:
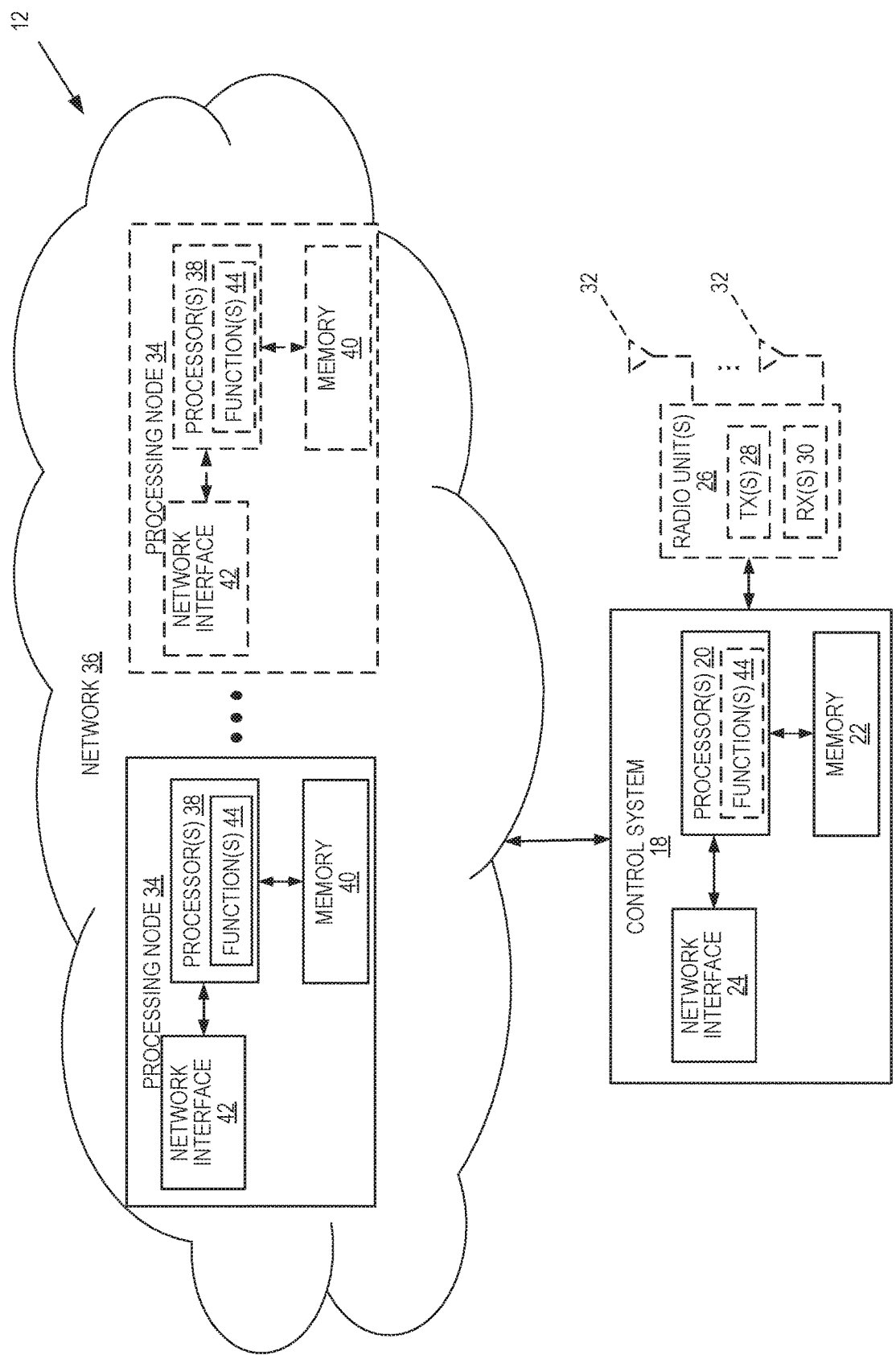

FIG. 11 is a schematic block diagram that illustrates a virtualized embodiment of the AN 12 according to some embodiments of the present disclosure. This discussion is equally applicable to other types of network nodes. Further, other types of network nodes may have similar virtualized architectures.

As used herein, a "virtualized" AN is an implementation of the AN 12 in which at least a portion of the functionality of the AN 12 is implemented as a virtual component(s), e.g., via a virtual machine(s) executing on a physical processing node(s) in a network(s). As illustrated, in this example, the AN 12 includes the control system 18 that includes the one or more processors 20 such as, for example, CPUs, ASICs, FPGAs, and/or the like, the memory 22, and the network interface 24 and the one or more radio units 26 that each includes the one or more transmitters 28 and the one or more receivers 30 coupled to the one or more antennas 32, as described above. The control system 18 is connected to the radio unit(s) 26 via, for example, an optical cable or the like. The control system 18 is connected to one or more processing nodes 34 coupled to or included as part of a network(s) 36 via the network interface 24. Each processing node 34 includes one or more processors 38 such as, for example, CPUs, ASICs, FPGAs, and/or the like, memory 40, and a network interface 42.

In this example, functions 44 of the AN 12 described herein are implemented at the one or more processing nodes 34 or distributed across the control system 18 and the one or more processing nodes 34 in any desired manner. In some particular embodiments, some or all of the functions 44 of the AN 12 described herein are implemented as virtual components executed by one or more virtual machines implemented in a virtual environment(s) hosted by the processing node(s) 34. As will be appreciated by one of ordinary skill in the art, additional signaling or communication between the processing node(s) 34 and the control system 18 is used in order to carry out at least some of the desired functions 44. Notably, in some embodiments, the control system 18 may not be included, in which case the radio unit(s) 26 communicate directly with the processing node(s) 34 via an appropriate network interface(s).

In some embodiments, a computer program including instructions which, when executed by at least one processor, causes the at least one processor to carry out the functionality of an AN 12 or a node such as, e.g., a processing node 34 implementing one or more of the functions 44 of the AN 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium, e.g., a non-transitory computer readable medium such as memory.

Figure 12:
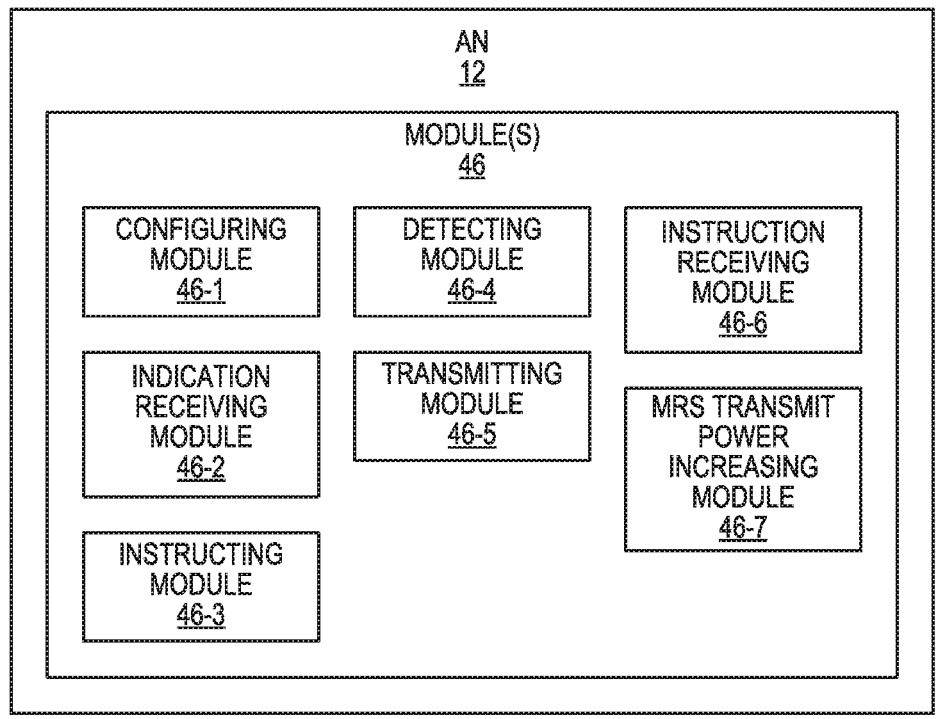

FIG. 12 is a schematic block diagram of the AN 12 according to some other embodiments of the present disclosure. The AN 12 includes one or more modules 46, each of which is implemented in software. The module(s) 46 provide the functionality of the AN 12 described herein. For example, in some embodiments where the AN 12 is the source AN 12-1, the module(s) 46 include a configuring module 46-1 operable to configure the UE 14 with a USS as described herein. Further, in some embodiments where the AN 12 is the source AN 12-1, the module(s) 46 may also include an indication receiving module 46-2 operable to receive an indication, such as e.g., a MRS report, from the UE 14 that a MRS search performed by the UE 14 to attempt to detect MRS transmitted by the candidate AN(s) 12-2 and/or 12-3 was unsuccessful, as described above, and an instructing module 46-3 operable to instruct at least one candidate AN 12-2 or 12-3 to temporarily increase MRS transmit power upon reception of the indication by the indication receiving module 46-2. In other embodiments where the AN 12 is the candidate AN 12-2 or 12-3, the module(s) 46 may include a detecting module 46-4 operable to detect a USS transmitted by the UE 14 and a transmitting module 46-5 operable to transmit a MRS with beamforming in a direction from which the USS was received from the UE 14 upon detection of the USS by the detecting module 46-4. In other embodiments where the AN 12 is the candidate AN 12-2 or 12-3, the module(s) 46 may include an instruction receiving module 46-6 operable to receive an instruction from a source AN 12-1 that serves the source beam 16-1 of the UE 14 to temporarily increase MRS transmit power and a MRS transmit power increasing module 46-7 operable to temporarily increase MRS transmit power at the candidate AN 12-2, 12-3 upon receiving the request. This discussion is equally applicable to the processing node 34 of FIG. 11 where the modules 46 may be implemented at one of the processing nodes 34 or distributed across multiple processing nodes 34 and/or distributed across the processing node(s) 34 and the control system 18.

Figure 13:
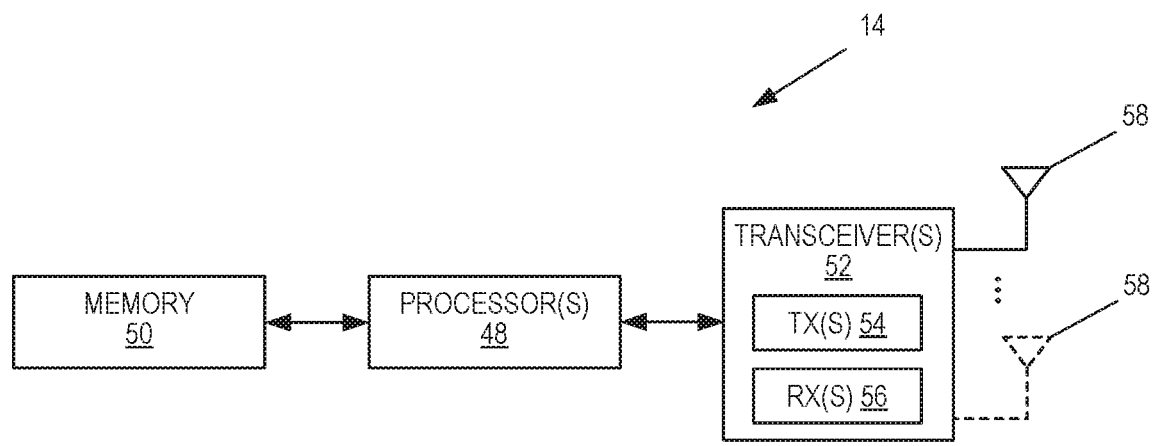
FIGS. 13 and 14 are block diagrams of various embodiments of a UE.

FIG. 13 is a schematic block diagram of the UE 14 according to some embodiments of the present disclosure. As illustrated, the UE 14 includes one or more processors 48 such as, for example, CPUs, ASICs, FPGAs, and/or the like, memory 50, and one or more transceivers 52 each including one or more transmitters 54 and one or more receivers 56 coupled to one or more antennas 58. In some embodiments, the functionality of the UE 14 described above may be fully or partially implemented in software that is, e.g., stored in the memory 50 and executed by the processor(s) 48.

In some embodiments, a computer program including instructions which, when executed by at least one processor, causes the at least one processor to carry out the functionality of the UE 14 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
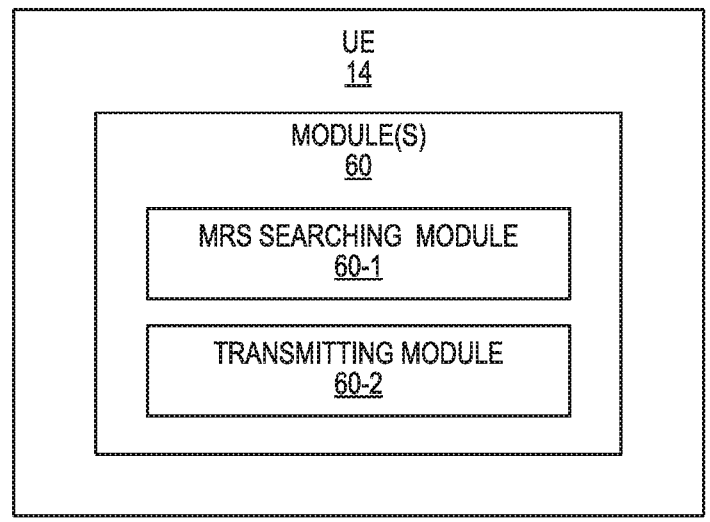

FIG. 14 is a schematic block diagram of the UE 14 according to some other embodiments of the present disclosure. The UE 14 includes one or more modules 60, each of which is implemented in software. The module(s) 60 provide the functionality of the UE 14 described herein. For example, in some embodiments, the module(s) 60 include a MRS searching module 60-1 operable to perform a MRS search to attempt to detect MRS transmitted by one or more candidate ANs 12-2 and/or 12-3 for one or more candidate beams and a transmitting module 60-2 operable to transmit an indication that the MRS search was unsuccessful if one or more conditions that are indicative of the MRS search being unsuccessful are met. The indication is, e.g., a MRS report in Option 1 and a USS configured for the UE 14 to trigger transmission of beam-formed MRS in Option 2.

EXAMPLE EMBODIMENTS

While not being limited thereto, some example embodiments of the present disclosure are provided below.

1. A method of operation of a User Equipment device, UE, (14) that transmits and/or receives to and/or from a source Antenna Node, AN, on a source beam, comprising:

performing (204, 304) a Mobility Reference Signal, MRS, search to attempt to detect MRS transmitted by one or more candidate ANs for one or more candidate beams; and if one or more conditions that are indicative of the MRS search being unsuccessful are met, transmitting (208, 308) a Uplink Synchronization Signal, USS, configured for the UE (14) to trigger transmission of beam-formed MRS by the one or more candidate ANs.

2. The method of embodiment 1 wherein the one or more conditions comprise expiration of a timer.

3. The method of embodiment 1 wherein the one or more conditions comprise a condition that a timer has expired without detection of a MRS during the MRS search.
4. The method of embodiment 1 wherein the one or more conditions comprise a condition that a timer has expired without detection of a MRS having a received Signal to Interference plus Noise Ratio, SINR, that is above a predefined or preconfigured threshold.
5. The method of any one of embodiments 1 to 4 further comprising receiving (202) configuration of the USS from the source AN of the UE (14).
6. The method of any one of embodiments 1 to 5 further comprising, after transmitting (208) the USS:
   detecting (214) a MRS transmitted by at least one of the candidate ANs; and
   reporting (216) the MRS to the source AN.
7. The method of any one of embodiments 1 to 5 further comprising, after transmitting (308) the USS:
   detecting (314) a MRS transmitted by at least one of the candidate ANs; and
   transmitting (316) a USS that matches the MRS detected by the UE (14).
8. A User Equipment device, UE, (14) that transmits and/or receives to and/or from a source Antenna Node, AN, on a source beam, the UE (14) adapted to:
   perform a Mobility Reference Signal, MRS, search to attempt to detect MRS transmitted by one or more candidate ANs for one or more candidate beams; and
   if one or more conditions that are indicative of the MRS search being unsuccessful are met, transmit a Uplink Synchronization Signal, USS, configured for the UE (14) to trigger transmission of beam-formed MRS by the one or more candidate ANs.
9. The UE (14) of embodiment 8 wherein the UE (14) is further adapted to operate according to the method of any one of embodiments 2 to 7.
10. A User Equipment device, UE, (14) that transmits and/or receives to and/or from a source Antenna Node, AN, on a source beam, the UE (14) comprising:
    at least one transmitter (54) and at least one receiver (56);
    at least one processor (48); and
    memory (50) storing instructions executable by the at least one processor (48) whereby the UE (14) is operable to:
      perform a Mobility Reference Signal, MRS, search to attempt to detect MRS transmitted by one or more candidate ANs for one or more candidate beams; and
      if one or more conditions that are indicative of the MRS search being unsuccessful are met, transmit a Uplink Synchronization Signal, USS, configured for the UE (14) to trigger transmission of beam-formed MRS by the one or more candidate AN.
11. A User Equipment device, UE, (14) that transmits and/or receives to and/or from a source Antenna Node, AN, on a source beam, the UE (14) comprising:
    a Mobility Reference Signal, MRS, searching module (60-1) operable to perform a MRS search to attempt to detect MRS transmitted by one or more candidate ANs for one or more candidate beams; and
    a Uplink Synchronization Signal, USS, transmitting module (60-2) operable to transmit a USS configured for the UE (14) to trigger transmission of beam-formed MRS by the one or more candidate ANs if one or more conditions that are indicative of the MRS search being unsuccessful are met.
12. A method of operation of a source Antenna Node, AN, that transmits and/or receives to and/or from a User Equipment device, UE, (14) on a source beam, comprising:
    configuring (202, 302) the UE (14) with a Uplink Synchronization Signal, USS, to be used by the UE (14) to trigger transmission of beam-formed Mobility Reference Signal, MRS, by the one or more candidate ANs.
13. The method of embodiment 12 further comprising:
    negotiating (200) with the one or more candidate ANs to determine the USS to be used by the UE (14) to trigger transmission of beam-formed MRS by the one or more candidate ANs.
14. The method of embodiment 12 or 13 further comprising:
    receiving (216) a report from the UE (14), the report comprising an indication of a MSR detected by the UE (14); and
    determining (218) a candidate AN of the one or more candidate ANs that transmitted the MSR detected by the UE (14); and
    initiating (218) a beam switch for the UE (14) from the source beam to a target beam provided by the candidate AN.
15. A source Antenna Node, AN, that transmits and/or receives to and/or from a User Equipment device, UE, (14) on a source beam, the source AN adapted to:
    configure the UE (14) with a Uplink Synchronization Signal, USS, to be used by the UE (14) to trigger transmission of beam-formed MRS by the one or more candidate ANs.
16. The source AN of embodiment 15 wherein the source AN is further adapted to operate according to the method of any one of embodiments 13 to 14.
17. A source Antenna Node, AN, that transmits and/or receives to and/or from a User Equipment device, UE, (14) on a source beam, the source AN comprising:
    at least one processor (20, 38); and
    memory (22, 40) storing instructions executable by the at least one processor (20, 38) whereby the source AN is operable to:
      configure the UE (14) with a Uplink Synchronization Signal, USS, to be used by the UE (14) to trigger transmission of beam-formed Mobility Reference Signal, MRS, by the one or more candidate ANs.
18. A source Antenna Node, AN, that transmits and/or receives to and/or from a User Equipment device, UE, (14) on a source beam, the source AN comprising:
    a configuring module (46-1) operable to configure the UE (14) with a Uplink Synchronization Signal, USS, to be used by the UE (14) to trigger transmission of beam-formed Mobility Reference Signal, MRS, by the one or more candidate ANs.

The following acronyms are used throughout this disclosure.
3GPP Third Generation Partnership Project
5G Fifth Generation
AMM Active Mode Mobility
AN Antenna Node
ASIC Application Specific Integrated Circuit
CPU Central Processing Unit
DMRS Demodulation Reference Signal
FPGA Field Programmable Gate Array
GHz Gigahertz LTE Long Term Evolution
MRS Mobility Reference Signal
MTC Machine Type Communication
NG Next Generation
NR New Radio Access Technology
PRACH Physical Random Access Channel
PSS Primary Synchronization Signal
RAN Radio Access Network
RAT Radio Access Technology
SINR Signal to Interference plus Noise Ratio
SRS Sounding Reference Signal
SSS Secondary Synchronization Signal
TR Technical Report
UE User Equipment
USS Uplink Synchronization Signal Those skilled in the art will recognize improvements and modifications to the embodiments of the present disclosure. All such improvements and modifications are considered within the scope of the concepts disclosed herein and the claims that follow.

What is claimed is:

1. A method of operation of a User Equipment device (UE) that transmits and/or receives to and/or from a source Antenna Node (AN) on a source beam, the method comprising:
    performing a Mobility Reference Signal (MRS) search to attempt to detect MRS transmitted by one or more candidate ANs for one or more candidate beams; and
    responsive to determining that one or more conditions that are indicative of the MRS search being unsuccessful are met, transmitting an indication that the MRS search was unsuccessful, wherein the one or more conditions comprise a condition that a timer has expired without detection of a MRS having a received Signal to Interference plus Noise Ratio (SINR) that is above a predefined or preconfigured threshold.

2. The method of claim 1, wherein transmitting the indication comprises transmitting an uplink signal.

3. The method of claim 2, wherein the uplink signal is an uplink signal configured for the UE to trigger transmission of beam-formed MRS by the one or more candidate ANs.

4. The method of claim 3, wherein the uplink signal is an Uplink Synchronization Signal (USS).

5. The method of claim 4, wherein the USS is a random access preamble.

6. The method of claim 3 further comprising receiving configuration of the uplink signal from the source AN of the UE.

7. The method of claim 3 further comprising, after transmitting the uplink signal:
    detecting a MRS transmitted by at least one of the one or more candidate ANs; and
    reporting the MRS detected by the UE to the source AN.

8. The method of claim 3 further comprising, after transmitting the uplink signal:
    detecting a MRS transmitted by at least one of the one or more candidate ANs; and
    transmitting an uplink signal that matches the MRS detected by the UE.

9. The method of claim 8, wherein the uplink signal that matches the MRS detected by the UE is a USS that matches the MRS detected by the UE.

10. The method of claim 1, wherein transmitting the indication comprises transmitting a report to the source AN, the report comprising one of a group consisting of: an indication that no MRSs were detected by the UE during the MRS search and an indication that any MRSs detected by the UE during the MRS search have a received Signal to Interference plus Noise Ratio (SINR) that is below a predefined or preconfigured threshold.

11. The method of claim 1, wherein the one or more conditions comprise expiration of a timer.

12. The method of claim 1, wherein the indication triggers an increase in MRS transmit power by at least one of the one or more candidate ANs.

13. A User Equipment device (UE) that transmits and/or receives to and/or from a source Antenna Node (AN) on a source beam, the UE comprising:
    at least one transmitter and at least one receiver;
    at least one processor; and
    memory storing instructions executable by the at least one processor whereby the UE is operable to:
        perform a Mobility Reference Signal (MRS) search to attempt to detect MRS transmitted by one or more candidate ANs for one or more candidate beams; and
        if one or more conditions that are indicative of the MRS search being unsuccessful are met, transmit an indication that the MRS search was unsuccessful, wherein the one or more conditions comprise a condition that a timer has expired without detection of a MRS having a received Signal to Interference plus Noise Ratio (SINR) that is above a predefined or preconfigured threshold.

14. A method of operation of a source Antenna Node (AN) that transmits and/or receives to and/or from a User Equipment device (UE) on a source beam, the method comprising:
    configuring the UE with an uplink signal to be transmitted by the UE to trigger transmission of beam-formed Mobility Reference Signal (MRS) by one or more candidate ANs;
    receiving a report from the UE, the report comprising an indication of a MRS detected by the UE;
    determining a candidate AN of the one or more candidate ANs that transmitted the MRS detected by the UE; and
    initiating a beam switch for the UE from the source beam to a target beam provided by the candidate AN.

15. The method of claim 14, wherein the uplink signal is an Uplink Synchronization Signal (USS).

16. The method of claim 15, wherein the USS is a random access preamble.

17. The method of claim 14, further comprising negotiating with the one or more candidate ANs to determine the uplink signal to be used by the UE to trigger transmission of beam-formed MRS by the one or more candidate ANs.

18. A source Antenna Node (AN) that transmits and/or receives to and/or from a User Equipment device (UE) on a source beam, the source AN comprising:
    at least one processor; and
    memory storing instructions executable by the at least one processor whereby the source AN is operable to:
        configure the UE with an uplink signal to be transmitted by the UE to trigger transmission of beam-formed Mobility Reference Signal (MRS) by one or more candidate ANs;
        receive a report from the UE, the report comprising an indication of a MRS detected by the UE;
        determine a candidate AN of the one or more candidate ANs that transmitted the MRS detected by the UE; and
        initiate a beam switch for the UE from the source beam to a target beam provided by the candidate AN.

* * * * *